United States Patent
Zhang et al.

(10) Patent No.: US 11,852,955 B2
(45) Date of Patent: Dec. 26, 2023

(54) PHOTO BOOTH HAVING DETACHABLE UPPER COVER

(71) Applicant: MARVEL TECHNOLOGY (CHINA) CO., LIMITED, Shenzhen (CN)

(72) Inventors: Shuo Zhang, Shenzhen (CN); Ruru Zhong, Shenzhen (CN)

(73) Assignee: MARVEL TECHNOLOGY (CHINA) CO., LIMITED, Shenzhen (CN)

( * ) Notice: Subject to any disclaimer, the term of this patent is extended or adjusted under 35 U.S.C. 154(b) by 0 days.

(21) Appl. No.: 18/070,599

(22) Filed: Nov. 29, 2022

(65) Prior Publication Data
US 2023/0168566 A1  Jun. 1, 2023

(30) Foreign Application Priority Data
Nov. 29, 2021  (CN) .......................... 202122947239.8

(51) Int. Cl.
*G03B 15/00*  (2021.01)
*H04N 23/57*  (2023.01)

(52) U.S. Cl.
CPC ............. *G03B 15/00* (2013.01); *H04N 23/57* (2023.01)

(58) Field of Classification Search
None
See application file for complete search history.

(56) References Cited

U.S. PATENT DOCUMENTS

| | | | | |
|---|---|---|---|---|
| 2,140,602 | A * | 12/1938 | Simjian ................ | G03B 19/023 396/338 |
| 2,448,084 | A * | 8/1948 | Davis ..................... | G03B 35/04 396/419 |
| 3,690,242 | A * | 9/1972 | Cruickshank .......... | G03B 15/08 355/48 |
| 4,236,795 | A * | 12/1980 | Kephart ................. | G03B 15/06 396/428 |
| 4,372,659 | A * | 2/1983 | Ogawa ................... | G03B 15/00 396/24 |

(Continued)

FOREIGN PATENT DOCUMENTS

CN  213904032 U  *  8/2021
CN  216979618 U  *  7/2022

(Continued)

*Primary Examiner* — Rodney E Fuller
(74) *Attorney, Agent, or Firm* — Daniel M. Cohn; Howard M. Cohn

(57) ABSTRACT

A photo booth having detachable upper cover includes a supporting stage, a rotatable shooting stand, and a driving assembly. The driving assembly is configured to drive the rotatable shooting stand to circumferentially rotate around the supporting stage. The supporting stage includes an upper cover and a reinforcement frame, and the upper cover detachably covers the reinforcement frame. The reinforcement frame includes a supporting ring, six supporting rods, and a connecting portion. The supporting ring is generally annular, and the six supporting rings and the connecting portions are disposed in a ring of the supporting ring. A first end of each of the six supporting rods is connected to an inner wall of the supporting rings, and a second end of each of the six supporting rods is connected to the connecting portion. The six supporting rods are uniformly disposed along a circumferential direction of the supporting ring.

10 Claims, 4 Drawing Sheets

(56) References Cited

U.S. PATENT DOCUMENTS

| | | | | |
|---|---|---|---|---|
| 4,590,351 | A * | 5/1986 | Pomroy | H05B 6/6411 |
| | | | | 219/755 |
| 8,317,668 | B2 * | 11/2012 | Sales | A63B 21/068 |
| | | | | 482/146 |
| 9,618,830 | B1 * | 4/2017 | Nicholas | G03B 15/06 |
| 9,641,730 | B2 * | 5/2017 | Rosenberry | F16M 13/00 |
| 11,027,170 | B2 * | 6/2021 | Carr | A63B 21/0557 |
| 11,394,857 | B1 * | 7/2022 | Telem | H04N 23/50 |
| 2002/0077231 | A1 * | 6/2002 | Dalebout | A63B 22/18 |
| | | | | 482/146 |
| 2003/0032533 | A1 * | 2/2003 | Hecox | A63B 22/18 |
| | | | | 482/130 |
| 2004/0018924 | A1 * | 1/2004 | Szydlowski | A63B 22/18 |
| | | | | 482/146 |
| 2016/0219192 | A1 * | 7/2016 | Rosenberry | F16M 11/18 |
| 2019/0175983 | A1 * | 6/2019 | Carr | A63B 22/18 |
| 2021/0223668 | A1 * | 7/2021 | Wiley, Jr. | F16M 11/10 |

FOREIGN PATENT DOCUMENTS

| | | | |
|---|---|---|---|
| CN | 217238598 U | * | 8/2022 |
| CN | 217467517 U | * | 9/2022 |
| CN | 217561901 U | * | 10/2022 |

* cited by examiner

PHOTO BOOTH HAVING DETACHABLE UPPER COVER

TECHNICAL FIELD

The present disclosure relates to a technical field of photographic camera devices, and in particular to an anti-shake photo booth.

BACKGROUND

Nowadays, with the development of technologies, photography and videography have become popular, shooting images is no longer a luxury, and selfie is more casual. Photo booths are 360-degree rotatable shooting platforms and also called 360Photobooth, which are platforms for 360-degree surround shooting. Compared with ordinary selfie devices, the photo booths provide further entertainment experience.

Currently, a stage of the 360Photobooth shares a common supporting shaft with a rotating arm of a shooting stand for shooting surrounding the stage, and the stage of the 360Photobooth and the rotating arm of the shooting stand have relatively high coupling degree. If users move too obviously on the stage, such as jumping, vibration generated by a force borne by the stage is directly transmitted to the rotating arm of the shooting stand and a shooting device through the supporting shaft, thereby causing shaking and unstable self-shooting, which seriously influences quality of shot images. There is no doubt that such conventional 360Photobooth is low in enjoyment and has no flexible shooting experience.

SUMMARY

The present disclosure aims to provide an anti-shake photo booth to solve the above technical problem for improving use stability of the anti-shake photo booth, improving shooting experience, and further increasing enjoyment of shooting.

In order to achieve above aims, the present disclosure provides the anti-shake photo booth, including a supporting stage, a supporting base, a supporting main shaft, a rotatable shooting stand, a stand supporting component, and a driving assembly. The supporting stage and the supporting base are connected through the supporting main shaft. The rotatable shooting stand includes a first connecting end and a second connecting end, The first connecting end is configured to connect and install a shooting device, The second connecting end of the rotatable shooting stand is movably connected to the stand supporting component. The stand supporting component is connected to the supporting base. The driving assembly is configured to drive the rotatable shooting stand .to rotate surrounding the supporting stage in a circumferential direction. A separating region is defined between the stand supporting component and the supporting main shaft.

Furthermore, the stand supporting component is a supporting sleeve, and the supporting sleeve and the supporting main shaft are coaxial.

Furthermore, the rotatable shooting stand includes a first stand and a second stand, the first stand is movably connected to the second stand. The first connecting end is disposed at the first stand, and the second connecting end is disposed at the second stand.

Furthermore, the driving assembly includes a driving motor, a motor mounting base, a first gear, a bearing, and a second gear. The motor mounting base is connected to the supporting base, the first gear is disposed at a power output end of the driving motor, the bearing is sleeved on an outer wall of the supporting sleeve, and the second gear is sleeved on an outer wall of the bearing. The first gear is engaged with the second gear, and the second connecting end is connected to an end surface of the second gear.

Furthermore, the first stand and the second stand are telescopic stands.

Furthermore, the anti-shake photo booth further includes an angle adjustment mechanism, a length direction of the second stand is parallel to an end surface of the supporting stage, and the first stand and the second stand are connected through the angle adjustment mechanism.

Furthermore, the supporting stage includes a supporting cover plate, a reinforcement frame, a bottom support, and fixing nuts. Outer threads are disposed on the supporting main shaft. The supporting cover plate covers on the reinforcement frame. The bottom support is connected to the reinforcement frame. The bottom support is sleeved on an outer wall of the supporting main shaft, the fixing nuts are disposed on two sides of the bottom support and are connected to the outer threads of the supporting main shaft for clamping and fixing the bottom support.

Furthermore, the supporting base includes an end cover, a supporting ring, and supporting rods. The end cover is connected to an end portion of the supporting main shaft. A first end of each of the supporting rods is connected to the supporting ring, a second end of each of the supporting rods is connected to an outer wall of the supporting sleeve. A side surface of each of the supporting rods is connected to an end surface of the end cover.

Furthermore, the first connecting end is a threaded rod.

Furthermore, the angle adjustment mechanism includes a rotating shaft, a fixing screw, a connecting rod, and an adjustment base. The adjustment base is disposed on the second stand. A first connecting hole and a first fixing hole are defined on a first end of the connecting rod, and a second end of the connecting rod is connected to the first stand. A second connecting hole is defined at the adjustment base. The adjustment base and the connecting rod pass through the first connecting hole and the second connecting hole through the rotating shaft to be hinged. A plurality of second fixing holes are further defined on the adjustment base in a circumferential direction of the rotating shaft. A distance between each of the plurality of second fixing holes and the second connecting hole is approximately equal to a distance between the first connecting hole and the first fixing hole, and the fixing screw penetrates through the first fixing hole and the second fixing hole to fix the connecting rod to the adjustment base.

Compared with the prior art, the present disclosure provides the anti-shake photo booth, which provides the separating region between the stand supporting component and the supporting main shaft, that is, the separating region is a spacing space between the stand supporting component and the supporting main shaft, and the stand supporting component and the supporting main shaft are not in direct contact. If power generated by users jumping on the supporting stage or moving obviously on the supporting stage is first transmitted to the supporting base through the supporting stage and the supporting main shaft, and the supporting base stands on the ground, thereby absorbing and damping shocks. The stand supporting component is not directly connected with the supporting main shaft, so that the rotatable shooting stand movably connected with the stand supporting component is hardly influenced by transmission of the power generated by the users moving on the supporting stage, the shooting device may continuously and stably stand, shock and shake are prevented, clearer images are shot, the shooting experience is improved, and the enjoyment of shooting is increased.

Figure 1:
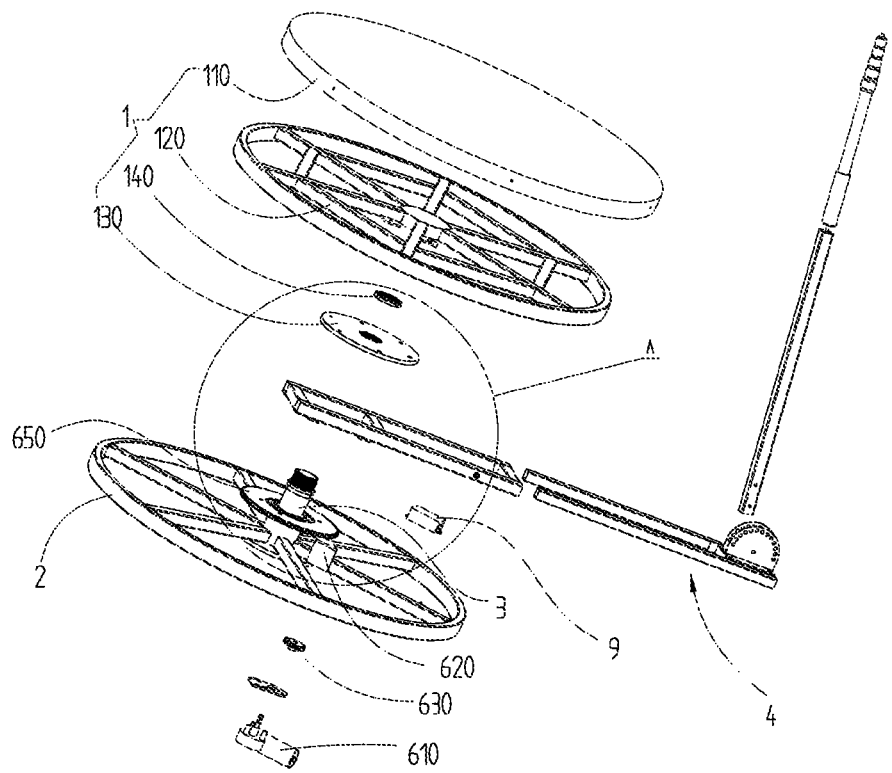
FIG. 1 is an exploded structural schematic diagram of an anti-shake photo booth according to one embodiment of the present disclosure.

Reference numerals in the drawings: 1. supporting stage; 110. supporting cover plate; 120. reinforcement frame; 130. bottom support; 131. inner threads; 140. fixing nut; 2. supporting base; 210. end cover; 220. supporting ring; 230. supporting rod; 3. supporting main shaft; 310. outer thread; 4. rotatable shooting stand; 410. first connecting end; 420. second connecting end; 430. first stand; 440. second stand; 5. stand supporting component; 6. driving assembly; 610. driving motor; 620. motor mounting base; 630. first gear; 640. bearing; 650. second gear; 651. screw hole; 7. separating region; 8. angle adjustment mechanism; 810. rotating shaft; 820. fixing screw; 830. connecting rod; 831. first connecting hole; 832. first fixing hole; 840. adjustment base; 841. second connecting hole; 842. second fixing hole; 9. control box.

DETAILED DESCRIPTION OF EMBODIMENTS

As shown in FIGS. 1-7, the present disclosure provides an anti-shake photo booth, including a supporting stage 1, a supporting base 2, a supporting main shaft 3, a rotatable shooting stand 4, a stand supporting component 5, and a driving assembly 6.

The supporting stage 1 and the supporting base 2 are connected through the supporting main shaft 3. The rotatable shooting stand 4 includes a first connecting end 410 and a second connecting end 420, The first connecting end 410 is configured to connect and install a shooting device, The second connecting end 420 of the rotatable shooting stand 4 is movably connected to the stand supporting component 5. The stand supporting component 5 is connected to the supporting base 2. The driving assembly 6 is configured to drive the rotatable shooting stand 4. to rotate surrounding the supporting stage 1 in a circumferential direction.

A separating region 7 is defined between the stand supporting component 5 and the supporting main shaft 3.

The supporting stage 1 and the supporting base 2 are connected to be a whole through the supporting main shaft 3, the supporting base 2 is configured to integrally support the anti-shake photo booth on the ground, a user stands on the supporting stage 1, the driving assembly 6 is started to work, the rotatable shooting stand 4 connected to the driving assembly 6 through the second connecting end 420 is driven to rotate surrounding the supporting stage 1 in the circumferential direction. The first connecting end 410 is configured to connect and install the shooting device, the first connecting end 410 is capable of clamping standing shooting devices, such as external devices of mobile phone supports, cameras, light supplementing lamps, etc.

Conventional 360 Photobooth directly provides the rotatable supporting stand on the supporting main shaft, and if power generated by users jumping on the supporting stage or moving obviously on the supporting stage is directly transmitted to the rotatable supporting stand through the supporting stage and the supporting main shaft, violent shaking is caused and quality of images shot by the shooting device is seriously affected, so that usage experience is poor.

Since the anti-shake photo booth provides the separating region 7 between the stand supporting component 5 and the supporting main shaft 3, that is, the separating region 7 is a spacing space between the stand supporting component 5 and the supporting main shaft 3, and the stand supporting component 5 and the supporting main shaft 3 are not in direct contact. If power generated by users jumping on the supporting stage or moving obviously on the supporting stage 1 is first transmitted to the supporting base 2 through the supporting stage 1 and the supporting main shaft 3, and the supporting base 2 stands on the ground, thereby absorbing and damping shocks. The stand supporting component 5 is not directly connected with the supporting main shaft 3, so that the rotatable shooting stand 4 movably connected with the stand supporting component 5 is hardly influenced by transmission of the power generated by the users moving on the supporting stage 1, the shooting device may continuously and stably stand, shock and shake are prevented, clearer images are shot, the shooting experience is improved, and the enjoyment of shooting is increased.

Figure 2:
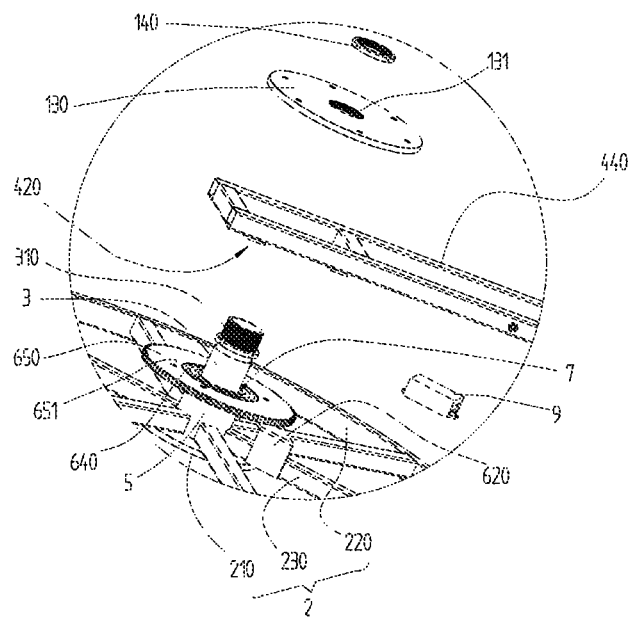
FIG. 2 is an enlarged schematic diagram of portion A shown in FIG. 1.
Figure 3:
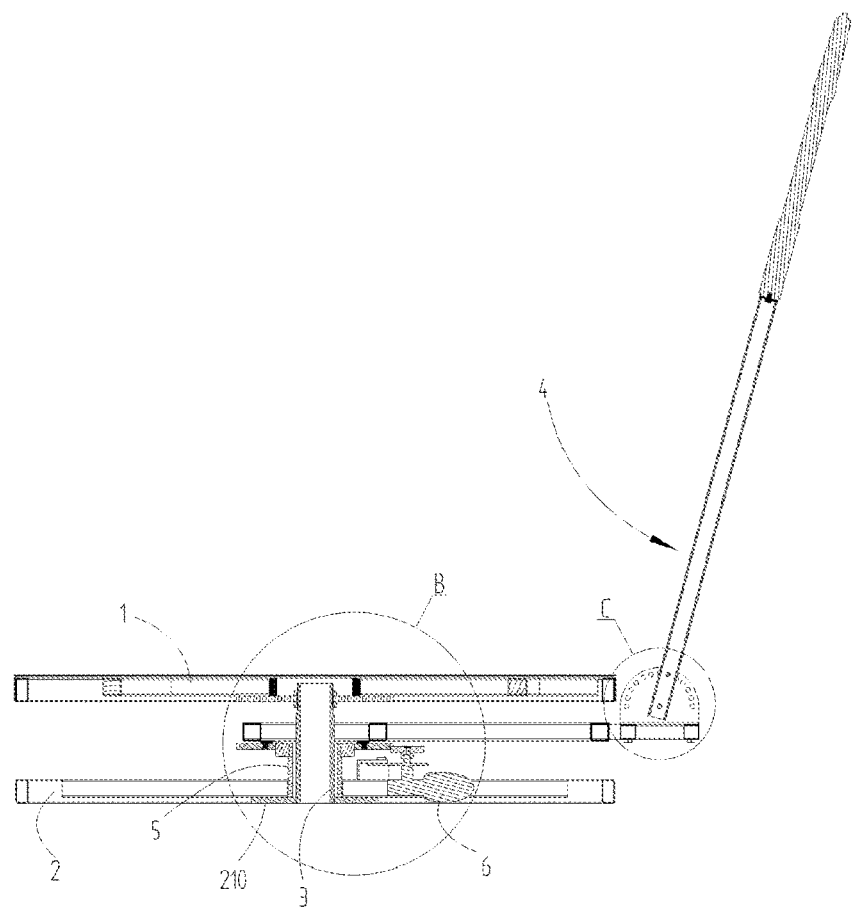
FIG. 3 is a cross-sectional schematic diagram of the anti-shake photo booth according to one embodiment of the present disclosure.
Figure 4:
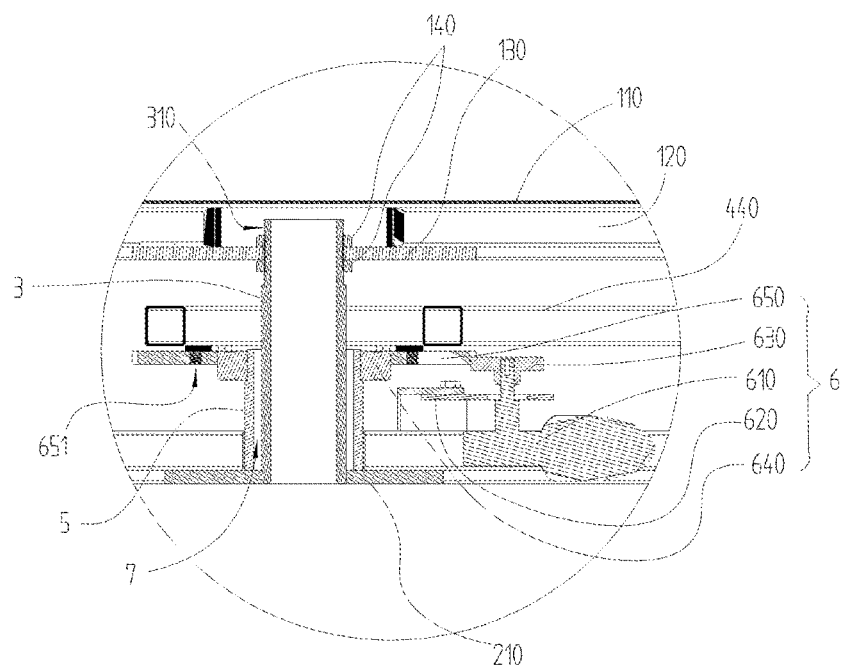
FIG. 4 is an enlarged schematic diagram of portion B shown in FIG. 3.
Figure 5:
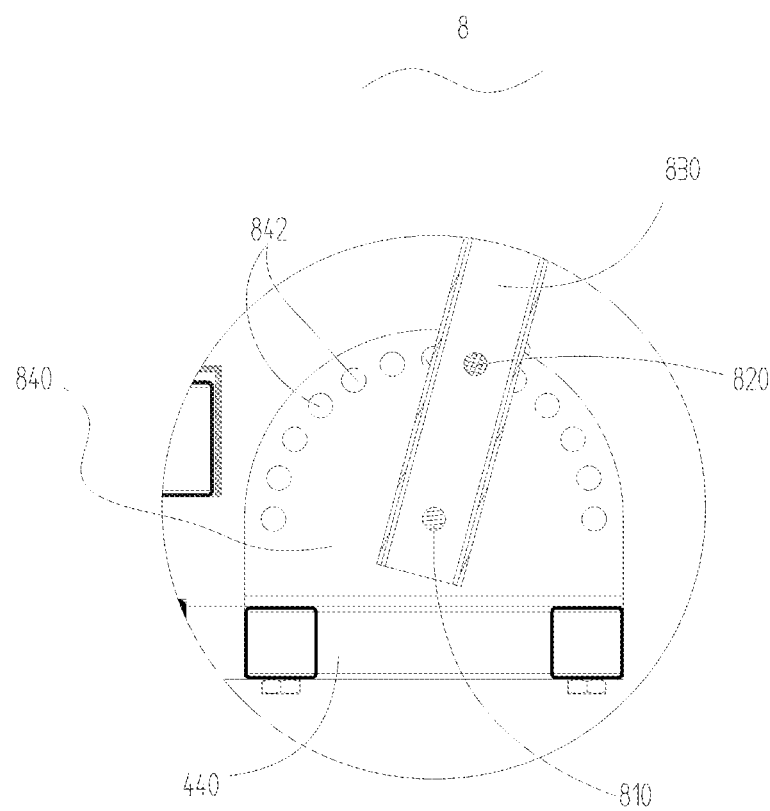
FIG. 5 is an enlarged schematic diagram of portion C shown in FIG. 3.

As shown in FIGS. 2-4, the stand supporting component 5 is a supporting sleeve, and the supporting sleeve and the supporting main shaft 3 are coaxial.

In one embodiment, the stand supporting component 5 is the supporting sleeve. The supporting sleeve is a hollow cylinder, and a structure of the supporting sleeve is similar to a structure of the shaft sleeve. A distance space between an inner wall of the supporting sleeve and an outer wall of the supporting main shaft 3 is the separating space 7, which prevents the rotatable shooting stand 4 from directly connecting to the supporting main shaft 3. The supporting main shaft 3 is generally disposed at a position corresponding to a center of the supporting stage 1, so that the supporting sleeve and the supporting main shaft 3 are coaxial, and the second connecting end 420 of the rotatable supporting stand 4 is movably connected with the supporting sleeve. The supporting sleeve is connected with the supporting base 2, and when the driving assembly 6 drives the rotatable supporting stand 4 to rotate surrounding the supporting stage 1 in the circumferential direction, so that the rotatable supporting stand 4 is prevented from being eccentric to a table top of the supporting stage 1.

A second stand 440 of the rotatable shooting stand 4 is disposed in a space between the supporting stage 1 and the supporting base 2, the second connecting end 420 is movably connected to the supporting sleeve, and the driving assembly 6 drives the second stand 440 to rotate surrounding the supporting sleeve in the circumferential direction, and the first connecting end 410 of a first stand 430 movably connected to the second stand 440 drives the shooting device to rotate surrounding the supporting stage 1 in the circumferential direction.

In one embodiment, the stand supporting component 5 is an annular guide rail (not shown in the drawings) connected to the supporting base 2, the separating region 7 is defined between the annular guide rail and the supporting main shaft 3, the driving assembly 6 is a trolley (not shown in the drawings) moving along the annular guide rail, the second connecting end 420 of the rotatable shooting stand 4 is connected to the trolley, and the trolley is started to move along the annular guide rail, that is, the rotatable shooting stand 4 is movably connected to the annular guide rail. When a contour of the annular guide rail is circular, and an axis of the annular guide rail is coaxial with the supporting main shaft 3, the rotatable shooting stand 4 rotates surrounding the supporting stage 1 in the circumferential direction; and when the contour of the annular guide rail is an irregular curve and the trolley is started to move along the annular guide rail, and a shooting effect in which the first connecting end 410 of the rotatable shooting stand 4 connects and installs the shooting device with a user standing on the supporting stage 1 in a distant and close position.

As shown in FIGS. 1-4 and 6, the rotatable shooting stand 4 includes a first stand 430 and a second stand 440, the first stand 430 is movably connected to the second stand 440. The first connecting end 410 is disposed at the first stand 430, and the second connecting end 420 is disposed at the second stand 440.

In one embodiment, the first stand 430 is movably connected to the second stand 440 by using a metal shaping hose (not shown in the drawings), so that a position of the first stand 430 is adjusted, for example, a height, a distance between the first stand 430 and the user, and an angle, so that the shooting device connected to the first connecting end 410 obtains a broader view angle for shooting.

As shown in FIGS. 1 and 3-4, the driving assembly 6 includes a driving motor 610, a motor mounting base 620, a first gear 630, a bearing 640, and a second gear 650. The motor mounting base 620 is connected to the supporting base 2, the first gear 630 is disposed at a power output end of the driving motor 610, the bearing 640 is sleeved on an outer wall of the supporting sleeve, and the second gear 650 is sleeved on an outer wall of the bearing 640. The first gear 630 is engaged with the second gear 650, and the second connecting end 420 is connected to an end surface of the second gear 650.

Specifically, the rotatable shooting stand 4 is connected to the end surface of the second gear 650 through the second connecting end 420 of the second stand 440, since the second gear 650 is sleeved on the outer wall of the bearing 640, the driving motor 610 disposed on the motor mounting base 620 drives the first gear 630 to rotate to engage with the second gear 650, thereby driving the rotatable shooting stand 4 to rotate surrounding the supporting stage 1 in the circumferential direction.

Preferably, a screw hole 651 is defined on the end surface of the second gear 650, and the second connecting end 420 of the second stand 440 is screwed with the screw hole 651 through a screw (not shown in the drawings). In addition, the second connecting end 420 of the second stand 440 and the end surface of the second gear 650 may also be connected in a welded manner.

As shown in FIGS. 1-4 and 6, the first stand 430 and/or the second stand 440 are telescopic stands.

When both the first stand 430 and the second stand 440 are of telescopic structures, the second stand 440 controls a horizontal distance between the first stand 430 and the supporting main shaft 3 by means of telescopic adjustment, so as to control a horizontal distance between the shoot device connected to the first connecting end 410 of the first stand 430 and the user; and the first stand 430 controls a perpendicular distance between the shooting device connected and mounted at the first connecting end 410 and the user by means of telescopic adjustment. Further, the broader view angle for shooting is obtained.

In some embodiments, the first stand 430 and the second stand 440 may be manually adjusted and retracted, and an electric push rod (not shown in the drawings) may also be selected to electrically and telescopically adjust the first stand 430 and the second stand 440, thereby enriching a shooting effect.

Preferably, the anti-shake photo booth further includes a control box 9 and an external remote controller (not shown in the drawings). The control box 9 is configured to control the driving motor 610 to turn on or off and further control a running speed of the driving motor 610. The external remote controller or a mobile device software is wirelessly connected to the control box 9, so that a control instruction is issued to the control box 9 to control an operation of the driving motor 610. Moreover, the electric push rod is controlled to drive the first stand 430 and the second stand 440 to stretch out and draw back, so that a view angle for shooting is adjusted in an operation process of the anti-shake photo booth, compared with a structure which needs to manually adjust, such telescopic structure is more flexible, and the shooting effect is enriched.

As shown in FIGS. 3 and 5-7, the anti-shake photo booth further includes an angle adjustment mechanism 8, a length direction of the second stand 440 is parallel to an end surface of the supporting stage 1, and the first stand 430 and the second stand 440 are connected through the angle adjustment mechanism 8.

The angle adjustment mechanism 8 is configured to adjust an included angle between the first stand 430 and the second stand 440, thereby adjusting the horizontal distance between the shoot device connected to the first connecting end 410 of the first stand 430 and the user.

As shown in FIGS. 1-4, the supporting stage 1 includes a supporting cover plate 110, a reinforcement frame 120, a bottom support 130, and fixing nuts 140. Outer threads 310 are disposed on the supporting main shaft 3. The supporting cover plate 110 covers on the reinforcement frame 120. The bottom support 130 is connected to the reinforcement frame 120. The bottom support 130 is sleeved on an outer wall of the supporting main shaft 3, the fixing nuts 140 are disposed on two sides of the bottom support 130 and are connected to the outer threads 310 of the supporting main shaft 3 for clamping and fixing the bottom support 130.

The reinforcement frame 120 is disposed on the supporting stage 1, so that the supporting stage 1 is safer and more durable.

Preferably, inner threads 131 are disposed at the bottom support 130 for screwing with the outer threads 310 of the supporting main shaft 3. Integrity of the support stage 1 is further enhanced. The bottom support 130 and the reinforcement frame 120 are screwed or welded.

As shown in FIGS. 1-4, the supporting base 2 includes an end cover 210, a supporting ring 220, and supporting rods 230. The end cover 210 is connected to an end portion of the supporting main shaft 3. A first end of each of the supporting rods 230 is connected to the supporting ring 220, a second end of each of the supporting rods is connected to the outer wall of the supporting sleeve. A side surface of each of the supporting rods 230 is connected to an end surface of the end cover 210.

The first end of each of the supporting rods 230 is connected to the supporting ring 220, and the second end of each of the supporting rods is connected to the outer wall of the supporting sleeve, so that adjacent two of the supporting rods 230 and the supporting ring 220 and the supporting sleeve enclose to form a substantially triangular fan-shaped frame structure, and durability of the supporting base 2 is improved due to stability of triangle.

Furthermore, the supporting main shaft 3 is welded to the end cover 210. The end cover 210, the supporting ring 220, the supporting rods 230, and the supporting sleeve are welded to each other.

Figure 6:
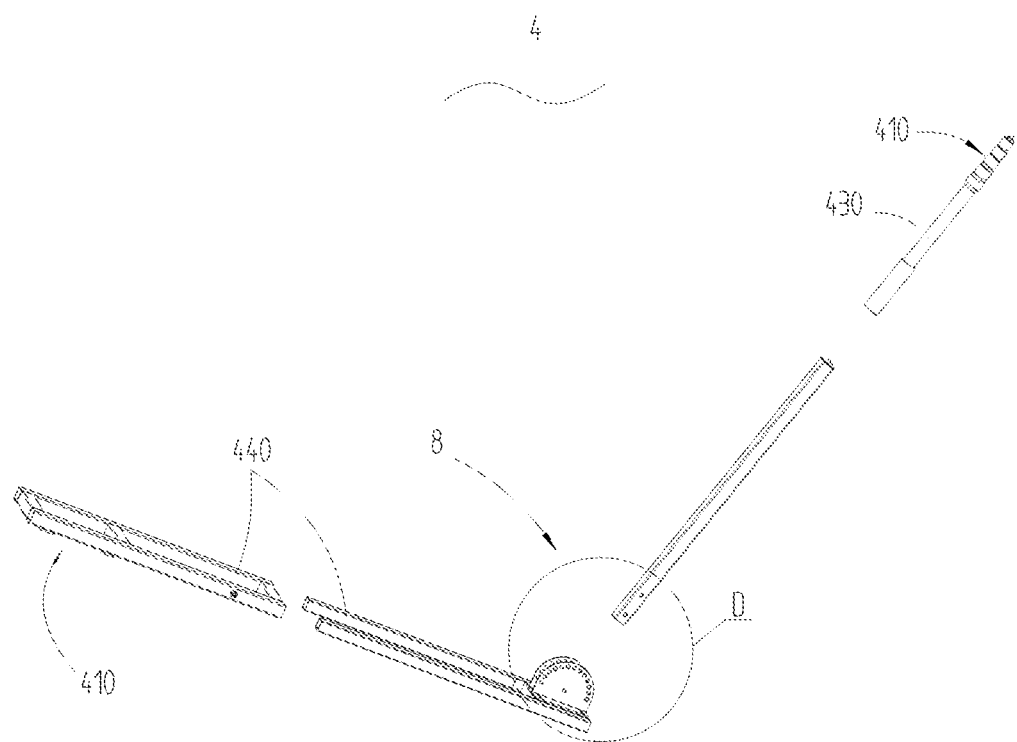
FIG. 6 is an exploded structural schematic diagram of a rotatable shooting stand of the anti-shake photo booth according to one embodiment of the present disclosure.
Figure 7:
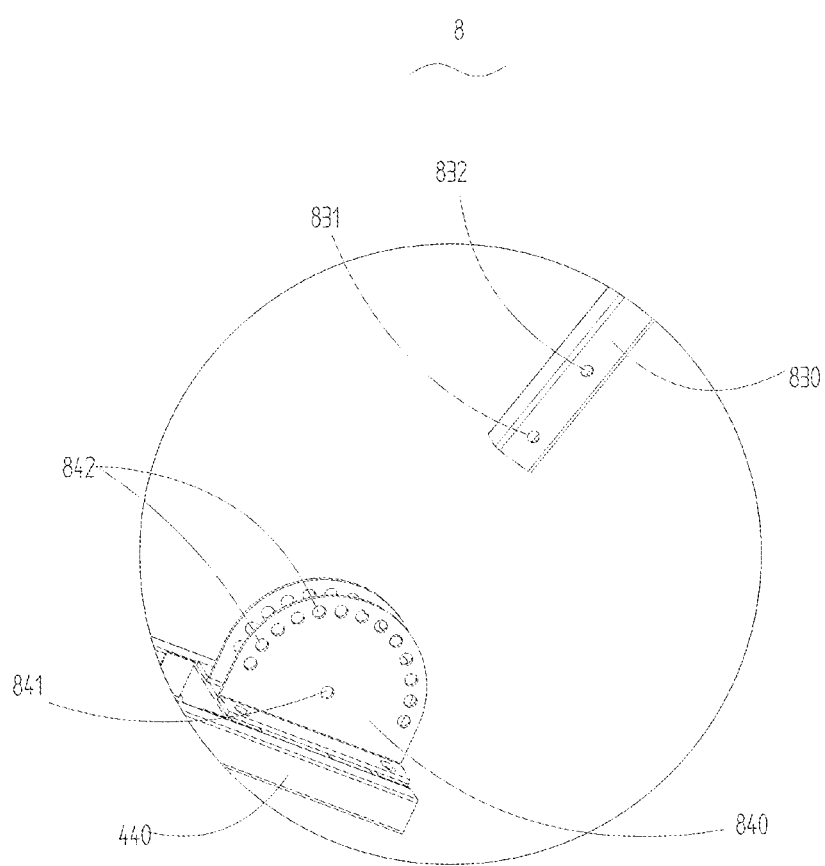
FIG. 7 is an enlarged schematic diagram of portion D shown in FIG. 6.

As shown in FIG. 6, the first connecting end 410 is a threaded rod.

Currently, most of the shooting devices are each provided with a threaded hole for connecting to a supporting stand and an external device. The first connecting end 410 is the threaded rod and is screwed with a threaded hole of a shooting device, such as a threaded hole of a mobile phone support, a camera, or a light supplementing lamp, and a universal adaptation degree is good.

As shown in FIGS. 3 and 5-7, the angle adjustment mechanism 8 includes a rotating shaft 810, a fixing screw 820, a connecting rod 830, and an adjustment base 840. The adjustment base 840 is disposed on the second stand 440. A first connecting hole 831 and a first fixing hole 832 are defined on a first end of the connecting rod 830, and a second end of the connecting rod 830 is connected to the first stand 430. A second connecting hole 841 is defined at the adjustment base 840. The adjustment base 840 and the connecting rod 830 pass through the first connecting hole 831 and the second connecting hole 841 through the rotating shaft 810 to be hinged. A plurality of second fixing holes 842 are further defined on the adjustment base 840 in a circumferential direction of the rotating shaft 810. A distance between each of the plurality of the second fixing holes 842 and the second connecting hole 841 is approximately equal to a distance between the first connecting hole 831 and the first fixing hole 832, and the fixing screw 820 penetrates through the first fixing hole 832 and a corresponding second fixing hole 842 to fix the connecting rod 830 to the adjustment base 840.

When the angle adjustment mechanism 8 adjusts the included angle between the first stand 430 and the second stand 440, the fixing screw 820 is taken out from the first fixing hole 832 and the corresponding second fixing hole 842, at this time, the connecting rod 830 is movably hinged to the adjustment base 840 through the rotating shaft 810, the connecting rod 830 is rotated to a required angle, the first fixing hole 832 corresponds to the corresponding second fixing hole 842 in the plurality of second fixing holes 842 defined on the circumferential direction of the rotating shaft 810, the fixing screw 820 penetrates through the first fixing hole 832 and the corresponding second fixing hole 842, so that the connecting rod 830 and the adjustment base 840 are fixed to complete angle adjustment.

What is claimed is:

1. A photo booth having detachable upper cover, comprising:
   a supporting stage;
   a rotatable shooting stand; and
   a driving assembly;
   wherein the driving assembly is configured to drive the rotatable shooting stand to circumferentially rotate around the supporting stage; the supporting stage comprises an upper cover and a reinforcement frame, and the upper cover detachably covers the reinforcement frame;
   wherein the photo booth having detachable upper cover further comprises a supporting base, a bottom support, and fixing nuts; a supporting main shaft is disposed on an upper end surface of the supporting base, and outer threads are disposed on the supporting main shaft; the bottom support is connected to a lower bottom surface of the reinforcement frame; the bottom support is sleeved on an outer wall of the supporting main shaft, the fixing nuts are disposed on two sides of the bottom support and are connected to the outer threads of the supporting main shaft for clamping and fixing the bottom support.

2. The photo booth having detachable upper cover according to claim 1, wherein the reinforcement frame comprises a supporting ring, six supporting rods, and a connecting portion; the supporting ring is generally annular, and the six supporting rods and the connecting portion are disposed in a ring of the supporting ring; a first end of each of the six supporting rods is connected to an inner wall of the supporting ring, and a second end of each of the six supporting rods is connected to the connecting portion.

3. The photo booth having detachable upper cover according to claim 2, wherein the six supporting rods are uniformly disposed along a circumferential direction of the supporting ring.

4. The photo booth having detachable upper cover according to claim 2, wherein the reinforcement frame further comprises six reinforcement rods, and each of the six reinforcement rods is connected to adjacent two of the six supporting rods.

5. The photo booth having detachable upper cover according to claim 2, wherein the upper cover comprises a supporting plate and a ring edge, the ring edge axially extends toward the supporting plate along an outer edge of the supporting plate; connecting holes are defined on each of outer walls of the ring edge and the supporting ring.

6. A photo booth having detachable upper cover, comprising:
   a supporting stage;
   a rotatable shooting stand; and
   a driving assembly;
   wherein the driving assembly is configured to drive the rotatable shooting stand to circumferentially rotate around the supporting stage; the supporting stage comprises an upper cover and a reinforcement frame, and the upper cover detachably covers the reinforcement frame;
   wherein the reinforcement frame comprises a supporting ring, a plurality of supporting rods, and a connecting portion; and
   wherein the upper cover comprises a supporting plate and a ring edge, the ring edge axially extends toward the supporting plate along an outer edge of the supporting plate; connecting holes are defined on each of outer walls of the ring edge and the supporting ring.

7. The photo booth having detachable upper cover according to claim 6, wherein the supporting ring is generally annular, and the six supporting rods and the connecting portion are disposed in a ring of the supporting ring; a first end of each of the six supporting rods is connected to an inner wall of the supporting ring, and a second end of each of the six supporting rods is connected to the connecting portion.

8. The photo booth having detachable upper cover according to claim 7, wherein the reinforcement frame further comprises six reinforcement rods, and each of the six reinforcement rods is connected to adjacent two of the six supporting rods.

9. The photo booth having detachable upper cover according to claim 8, wherein the supporting rods are uniformly disposed along a circumferential direction of the supporting ring.

10. The photo booth having detachable upper cover according to claim 6, wherein the photo booth having detachable upper cover further comprises a supporting base, a bottom support, and fixing nuts; a supporting main shaft is disposed on an upper end surface of the supporting base, and outer threads are disposed on the supporting main shaft; the bottom support is connected to a lower bottom surface of the reinforcement frame; the bottom support is sleeved on an outer wall of the supporting main shaft, the fixing nuts are disposed on two sides of the bottom support and are connected to the outer threads of the supporting main shaft for clamping and fixing the bottom support.

\* \* \* \* \*